United States Patent [19]

Kiya

[11] Patent Number: 4,780,829
[45] Date of Patent: Oct. 25, 1988

[54] NUMERICAL CONTROL APPARATUS HAVING OVERTRAVEL CHECK FUNCTION

[75] Inventor: Nobuyuki Kiya, Hachioji, Japan

[73] Assignee: Fanuc Ltd, Minamitsuru, Japan

[21] Appl. No.: 945,674

[22] PCT Filed: Apr. 7, 1986

[86] PCT No.: PCT/JP86/00168

§ 371 Date: Dec. 8, 1986

§ 102(e) Date: Dec. 8, 1986

[87] PCT Pub. No.: WO86/06184

PCT Pub. Date: Oct. 23, 1986

[30] Foreign Application Priority Data

Apr. 8, 1985 [JP] Japan .................. 60-72827

[51] Int. Cl.⁴ ............... G06F 15/18; G06F 15/46
[52] U.S. Cl. ................. 364/474.35; 318/632
[58] Field of Search ............. 364/167, 170, 474, 475; 318/561, 632, 601, 603, 448

[56] References Cited

U.S. PATENT DOCUMENTS

| | | | |
|---|---|---|---|
| 3,353,161 | 11/1967 | Toscano | 318/632 |
| 3,555,252 | 1/1971 | Garden | 318/561 |
| 3,585,376 | 6/1971 | Toscano | 318/632 |
| 3,612,840 | 10/1971 | Stobbe | 364/167 |
| 4,107,654 | 8/1978 | Nishijima | 318/601 |
| 4,131,837 | 12/1978 | Whetham | 318/561 |
| 4,250,441 | 2/1981 | Chapman et al. | 318/626 |
| 4,353,019 | 10/1982 | Sweeney, Jr. | 318/561 |
| 4,379,987 | 4/1983 | Kohzai et al. | 318/561 |
| 4,549,271 | 10/1985 | Nozawa et al. | 364/474 |

Primary Examiner—John R. Lastova
Attorney, Agent, or Firm—Staas & Halsey

[57] ABSTRACT

A numerical control apparatus (10) having an overtravel check function, includes a central processing unit (11), periodically performs pulse distribution, adds an amount of distribution to a present machine position stored in a present machine position register (R2), and checks whether the sum value falls within a preset moving range of a machine. If the value falls within the moving range, the amount of distribution is output and added to the present machine position register (R2) to update the machine position. On the other hand, if the value falls outside the moving range, a corrected amount of distribution obtained by subtracting the present machine position from the overtravel preset value is output and added to the present machine position register (R2) to update the present machine position.

2 Claims, 2 Drawing Sheets

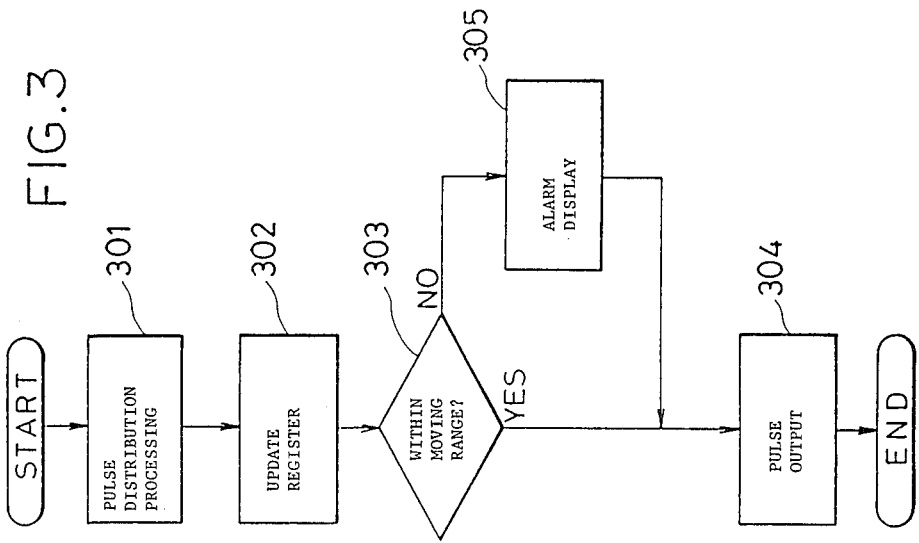
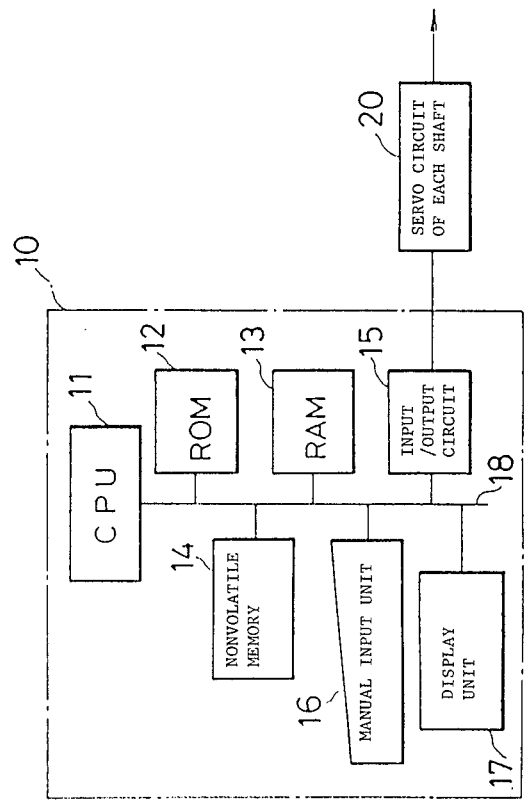

NUMERICAL CONTROL APPARATUS HAVING OVERTRAVEL CHECK FUNCTION

TECHNICAL FIELD

The present invention relates to a numerical control apparatus having an overtravel check function and, more particularly, to a numerical control apparatus of this type which reliably drives a control shaft so that the control shaft is not moved beyond an overtravel preset value.

BACKGROUND ART

It is known to control a machine having one or more moving portions by a numerical control apparatus (to be referred to as an NC apparatus hereinafter), and to control respective moving portions by one or more control shafts (to be referred to as shafts hereinafter). In a conventional numerical control apparatus (to be referred to as an NC apparatus hereinafter) of this type, pulse distribution to each shaft is performed based on an NC program at predetermined cycles, and a servo motor for each shaft is driven to drive the shaft. On the other hand, check for overtravel of each shaft is performed by checking whether the shaft is moved beyond the overtravel preset value after completion of pulse distribution processing for each cycle.

Since overtravel check is delayed by one cycle of pulse distribution from pulse distribution, a shaft is stopped beyond the overtravel preset value by an amount equal to a product of its feeding speed and a pulse distribution cycle. Therefore, when the pulse distribution cycle is 8 msec and the maximum feeding speed is 10 m/min, the shaft may overrun a maximum of about 1.33 mm (10,000×1/60×8/1,000).

For this reason, conventionally, a real moving limit position of a machine cannot be set as the overtravel preset value, but a value added with a margin equal to the product of the maximum feeding speed and the pulse distribution cycle described above must be set, resulting in a narrow actual moving range.

However, according to a machine or an apparatus to be controlled by an NC apparatus, the machine must be moved from an end to the other end of a moving range of the machine. For example, when an injection molding machine is controlled by an NC apparatus, the machine must be moved from an end to the other end of the moving range of the machine by JOB feeding during purging or lock up adjustment of a clamp. In such an operation, for the above-mentioned reason, a stop position of the machine is not fixed according to the feeding speed and the distribution processing timing, and the machine cannot be moved in the maximum moving range.

DISCLOSURE OF INVENTION

It is an object of the present invention to provide an NC apparatus capable of exactly controlling each shaft of a machine to be controlled to an overtravel preset value, and setting the preset value equal to a machine moving limit position, thereby substantially enlarging a moving range of the machine and exactly stopping the machine at a predetermined limit position.

In order to achieve the above object, according to the present invention, a check means checks whether a value obtained by adding an amount of distribution from a pulse distribution means and a stored value of a present machine position register for storing a present position of the machine falls within a preset movable range. If the value falls within the moving range, the above amount of distribution is output, and an updating means adds the present machine position with the amount of distribution to update the machine position. On the other hand, if the value falls outside the moving range, a distribution correction means is operated to output a corrected amount of distribution obtained by subtracting the present machine position from the overtravel preset value, and the updating means adds the corrected amount of distribution to the present machine position register to update the present machine position.

As described above, according to the present invention, the pulse distribution to each shaft controlled by an NC apparatus is performed. When the present position of the machine obtained by distribution exceeds the overtravel preset value, the corrected amount of distribution equal to the amount of from the present machine position to the overtravel preset value is distributed, so that each shaft can be exactly driven up to and stopped at the overtravel set position. Therefore, when an injection mechanism of an injection molding machine is to be controlled by a servo motor, an accident in which the distal end of a screw is moved beyond the overtravel preset position and strikes against a heating cylinder to damage the screw or a nozzle can be prevented, and the screw can be exactly stopped at the overtravel preset position coinciding the moving limit position, thereby conveniently and reliably performing purging or the like.

BRIEF DESCRIPTION OF DRAWINGS

FIG. 2 is a block diagram of an NC apparatus according to an embodiment of the present invention; and FIG. 3 is a flow chart similar to that of FIG. 1 in a conventional NC apparatus.

BEST MODE OF CARRYING OUT THE INVENTION

Figure 1:
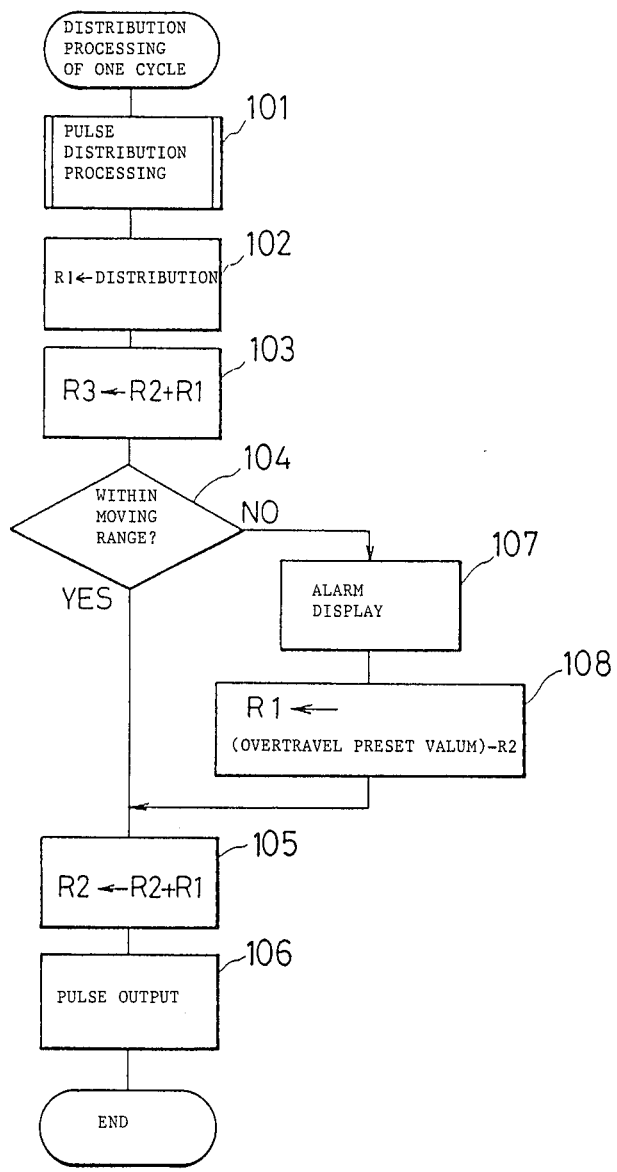
FIG. 1 is a flow chart of an overtravel check processing control program executed by an NC apparatus according to an embodiment of the present invention.

FIG. 3 shows overtravel check processing in a conventional NC apparatus. In FIG. 3, first, an amount of movement for each shaft is obtained by pulse distribution processing of step 301. Then, the amount of distribution is added to a machine position register for storing a moving position of each shaft to update a stored value of each register (step 302). If the updated value of the machine position register does not exceed the overtravel preset value, a distribution pulse is output to a servo circuit (steps 303 and 304). On the other hand, if the value of the above machine position register exceeds the moving range, an alarm display is performed and then the distribution pulse is output (steps 303, 305, and 304). In the next cycle, an amount of distribution to the overtravelled shaft is set to be zero in the pulse distribution processing.

Because of the above-mentioned processing, overrun occurs after detection of overtravel, resulting in an inconvenience described above.

An embodiment of the present invention will now be described in detail with reference to FIGS. 1 and 2.

FIG. 2 shows an NC apparatus according to an embodiment of the present invention. In FIG. 2, the NC apparatus 10 includes a central processing unit (to be referred to as a CPU hereinafter) 11, a ROM 12 storing a program for controlling the entire NC apparatus 10, a RAM 13 for, e.g., temporarily storing data, and a nonvolatile memory 14 for storing an NC machining program. Note that the NC machining program may be stored in a tape and read out by a tape reader. The NC apparatus 10 further includes an input/output circuit 15 connected to servo circuits (one of them is denoted by reference numeral 20) for respective shafts, a manual input unit 16 for inputting data and various instructions, and a display unit 17.

Overtravel check processing for a single shaft executed by the above NC apparatus 10 will now be described with reference to FIG. 1.

The CPU 11 (FIG. 2) executes the control program of FIG. 1 at predetermined cycles. First, in accordance with the NC machining program read out from the nonvolatile memory 14, the pulse distribution processing is performed by the CPU 11 as a pulse distribution means (step 101), and an amount of distribution is stored in a distribution register R1 (step 102). Then, the above amount of distribution is added to a value of a present machine position register R2 for storing the present position of the shaft of the machine, and a register R3 stores the sum value R2+R1 (step 103). The CPU 11 checks whether the value R2+R1 falls within the moving range determined by the overtravel preset value set through the input device 15 (step 104). If the value falls within the moving range, the CPU 11 adds the value of the distribution register R1, i.e., the amount of distribution, to the present machine position register R2 to update the value of the present machine position register R2 to the value R2+R1 (step 105), outputs the distribution pulse (step 106), and drives the servo circuit 20 for the shaft to drive its servo motor (not shown).

On the other hand, if the value of the register R3 falls outside the moving range, i.e., exceeds the overtravel preset value, in step 104, the CPU 11 displays by the display unit 17 that an overtravel position is reached (step 107). The CPU 11 subtracts the value of the present machine position register R2 from the overtravel preset value, and causes the distribution register R1 to store the resultant value (step 108). More specifically, the CPU 11 calculates a value of distance between the present machine position and the moving limit position represented by the overtravel preset value, causes the distribution register R1 to store the calculated value as a corrected amount of distribution, adds the obtained corrected amount of distribution to the present machine position register R2 to update its value in step 105, and then outputs the distribution pulse (step 106), thereby completing the pulse distribution in one cycle.

The above description has been made with reference to the overtravel check processing for a single shaft of the machine, but the present invention can be applied to the case in which a machine has a plurality of movable portions and each movable portion is controlled by one or more shafts. That is, after the distribution processing in step 101 of FIG. 1, processing similar to steps 102 to 106 for respective shafts may be sequentially executed.

I claim:

1. A numerical control apparatus having an overtravel check function, for controlling a machine having an operating section which is movable along a control axis within a moving range determined by at least one moving limit position, said control apparatus comprising:

a pulse distribution means for cyclically distributing pulses for the control axis in accordance with a numerical control program;

means, connected to the operating section and said pulse distribution means, for moving the operating section in accordance with an amount of distribution corresponding to a number of pulses distributed from said pulse distribution means;

a present machine position register, connected to the operating section, for storing a present position of the operating section;

check means, coupled to said present machine position register, for comparing a sum value of a stored value of said present machine position register and the amount of distribution to be distributed during a next cycle from said pulse distribution means and having at least one overtravel preset value which is equal to the at least one moving limit position, for checking whether or not a resultant moving position of the operating section after execution of pulse distribution for the next cycle falls within the moving range;

distribution correction means for, if said check means determines that a possible resultant moving position of the operating section after execution of pulse distribution for the next cycle falls outside the moving range, subtracting the stored value of said present machine position register from said overtravel preset value to obtain a corrected amount of distribution; and updating means for, if said check means determines that the possible resultant moving position falls within the moving range, outputting the amount of distribution from said pulse distribution means and adding said amount of distribution to the stored value of said present machine position register to update the stored value, and for, if said check means determines that the possible resultant moving position falls outside the moving range, outputting the corrected amount of distribution from said distribution correction means and adding said corrected amount of distribution to the stored value of said present machine position register to update the stored value, whereby the operating section is permitted to move within the moving range including the at least one moving limit position and is prevented from moving outside the moving range.

2. An apparatus according to claim 1, further comprising a display unit, wherein said display unit provides an alarm display if said check means determines that the possible resultant moving position falls outside the moving range.

* * * * *